Patented Sept. 4, 1951

2,566,513

UNITED STATES PATENT OFFICE 2,566,513

ALUMINUM ARTICLE COATED WITH HEAT-SEALABLE COMPOSITION

George H. Bischoff, Fort Devens, Mass., assignor to Monsanto Chemical Company, St. Louis, Mo., a corporation of Delaware No Drawing. Application September 10, 1948, Serial No. 48,753

3 Claims. (Cl. 117—122)

This invention relates to the preparation of coated articles. More particularly, this invention relates to the preparation of coated aluminum articles.

With the increased availability of aluminum, the possibility of using this metal for various purposes has been the subject of wide investigation. Certain of the possible uses involve coating the aluminum with an adherent film. For example, the use of aluminum foil for packaging purposes frequently necessitates applying to the foil a heat-sealable coating which is "non-blocking" under ordinary conditions, but at the same time, is highly adherent to the foil. Such coatings fulfill the function of enabling a package comprising the foil to be effective sealed by hot pressing together two foil surfaces having an intermediate layer of the adhesive coating.

It is an object of the invention to provide coated aluminum articles. It is a particular object of this invention to provide aluminum articles with highly adhesive coatings of polyvinyl butyral-nitrocellulose compositions.

These and other objects are attained according to this invention by coating aluminum with a polyvinyl butyral-nitrocellulose composition plasticized with butyl ricinoleate.

The following examples are illustrative of the present invention, but are not to be construed as limitative thereof. Where parts are mentioned, they are parts by weight.

The method followed in the examples is to allow the nitrocellulose to soak in the ethanol until it is well softened and then add the ethyl acetate, followed by stirring and heating until the nitrocellulose is completely dissolved. The plasticizer is then added to the nitrocellulose solution and while rapidly agitating the resulting product, the polyvinyl butyral, in finely divided form, is quickly added. Stirring is continued until the viscosity is too high to permit easy stirring, and then the viscous solution is allowed to stand at 50–60° C. to complete the solution of any undissolved polyvinyl butyral and to allow air bubbles to escape.

In applying the solution to aluminum foil, the foil is placed on a smooth rigid surface such as a sheet of plate glass moistened with water, toluene, alcohol, or other liquid. The foil (0.001 inch thick) is smoothed out on the moistened glass and the coating solution is applied to the foil by means of a doctor blade to achieve an even coating. In the examples, the doctor blade is adjusted to give a coating thickness of 0.0015–0.002 inch after drying.

The coated foil is allowed to air dry for a short period of time until the coated surface is tack-free, and then the coated foil is placed in a drier at 80° C. to remove the remaining solvent.

Prior to testing, the coated foil is conditioned by standing for at least 16 hours at 25° C. and 50% relative humidity.

For the purpose of evaluating the adhesion of the coatings of the invention, conditioned samples are cut into strips 1 inch wide and about 6 inches long. By moistening one end of these strips with ethyl acetate, the coating may be loosened and the stripping initiated. After severing the portion of the strip which is moistened with ethyl acetate, the specimen is clamped in a Scott-L5 rubber tensile testing apparatus in which a 15-pound spring scale has been substituted for the dial recording mechanism normally installed on this tester. The portion of the foil from which the plastic coating is stripped, as indicated above, is placed in the clamp which is attached to a 15-pound spring scale. The free plastic end is placed in the clamp on the movable carriage. The coated end of the specimen strip is held at right angles to the free foil and free plastic ends. In conducting the test, the foil is separated from the plastic at a constant rate.

The polyvinyl butyral used in Examples I–IV is made up on a weight basis of about 17–21% hydroxyl groups calculated as polyvinyl alcohol, less than 3% acetate groups calculated as polyvinyl acetate and the balance substantially butyraldehyde acetal. It is made from a polyvinyl acetate of such a viscosity that a 7.5% solution by weight in methanol of the polyvinyl butyral has a viscosity of 160 centipoises at 20° C. Polyvinyl butyrals having other viscosities may be used, e. g., 25–300 centipoises under the same conditions.

The nitrocellulose used in Examples I–IV is of the so-called one-half second viscosity grade and contains approximately 11% nitrogen.

In each of the examples in Table A, 25 parts of nitrocellulose, 50 parts of ethyl acetate and 400 parts of ethanol are used for every 100 parts of polyvinyl butyral. The parts of butyl ricinoleate set forth in the table are based on 100 parts of polyvinyl butyral.

TABLE A

| Example | Butyl Ricinoleate Parts | Adhesion (Ounces per inch width) |
|---|---|---|
| I | 15 | 12.5 |
| II | 20 | 13.0 |
| III | 25 | 16.0 |
| IV | 30 | 16.5 |

In contrast to the excellent adhesion results obtained in Examples I—IV, substitution of corresponding amounts of dibutyl sebacate for the butyl ricinoleate gives corresponding products which have adhesion values of 9.5, 8.0, 8.0, and 8.0 respectively.

It is also found that the compositions of Examples I–IV give significantly higher adhesion values when coated on aluminum foil as compared with otherwise similar compositions in which the butyl ricinoleate is replaced by such plasticizers as tricresyl phosphate, dioctyl phthalate, triethylene glycol dihexoate, etc.

It is further discovered that the unusually high adhesion values of the invention are obtained when compositions are used in which the relative proportions of nitrocellulose and butyl ricinoleate are substantially varied. Thus, adhesion values comparable to those set forth in Examples I–IV are obtained in a series of compositions containing 25 parts of butyl ricinoleate for every 100 parts of polyvinyl butyral and 25, 30, 35, and 40 parts, respectively, of the nitrocellulose. In another series of experiments, 30 parts of butyl ricinoleate are used and 30, 35, 40, and 45 parts, respectively, of nitrocellulose are incorporated. In a further series of experiments, 35 parts of butyl ricinoleate are used in conjunction with 35, 40, 45, and 50 parts, respectively, of nitrocellulose. Although minor variations in the adhesive values are obtained, in general the results are of the same order of magnitude as those set forth in Examples I–IV and in all cases are unexpectedly higher than those obtained when such other plasticizers as dibutyl sebacate are substituted for the butyl ricinoleate.

In the following example, the polyvinyl butyral is similar to the one used in Examples I–IV, except that it is made from a polyvinyl acetate having a lower viscosity so that the polyvinyl butyral has a viscosity of about 54 centipoises under the same conditions that the polyvinyl butyral of the previous examples gives a viscosity of 160 centipoises.

The nitrocellulose used in the following example is similar to the one used in Examples I–IV, except that it is of the 20–30 second grade.

Example V

| | Parts |
|---|---|
| Polyvinyl butyral | 100 |
| Nitrocellulose | 25 |
| Butyl ricinoleate | 20 |
| Ethyl acetate | 50 |
| Ethanol | 400 |

Aluminum foil is coated with this composition in the same manner as in the previous examples. The resulting coating has an adhesion of 13.6 ounces per inch width and is to be contrasted with the value of 6.4 ounces obtained when dibutyl sebacate is substituted for the butyl ricinoleate.

As indicated hereinbefore, numerous variations may be introduced into the compositions of the invention and the methods of applying the coating compositions without departing from the spirit of the invention. Thus, nitrocellulose having various viscosity characteristics may be used, for example, from ¼-second to 100-second nitrocellulose. The nitrocellulose used may be that customarily employed in either the plastics or coating industries. These nitrocellulose products usually have a nitrogen content of about 10.5–12.5%. Low viscosity nitrocellulose, e. g., ½ second, is preferred when the acetal resin has a viscosity (as defined above) of 100 centipoises or above. The viscosity values given herein for nitrocellulose are determined by A. S. T. M. method D301-33.

The polyvinyl butyral employed may be varied substantially as regards its physical and chemical characteristics. Thus, the polyvinyl butyral may be made from polyvinyl acetate having varying viscosities, e. g., 1-molar benzene solutions thereof may have viscosities of 5–500 centipoises at 20° C., with the result that solutions of the polyvinyl butyral vary substantially in viscosity. The hydroxyl group and ester content of the polyvinyl butyral is also subject to considerable variation. Usually, it is found that the polyvinyl butyral should contain at least 5% hydroxyl groups by weight calculated as polyvinyl alcohol and, generally, not more than 30%. A preferred range is 10–25% hydroxyl groups calculated as polyvinyl alcohol. The acetate or other ester group content of the acetal may also vary substantially. Thus, the ester group content may be entirely eliminated, or there may be as much as 30–35% ester groups by weight calculated as polyvinyl ester.

As indicated by the examples, the relative proportions of acetal resin, nitrocellulose and plasticizer may be substantially varied. Usually, it is found that at least 5 parts of butyl ricinoleate for every 100 parts of acetal resin are desirable, and for most applications, not more than 50 parts are generally used. If desired, a portion of the butyl ricinoleate may be replaced by another plasticizer such as those mentioned above, but for maximum adhesion characteristics, this practice should not be followed. In any event, at least 5 parts butyl ricinoleate should be present and a preferred range is 20–40 parts for every 100 parts of polyvinyl butyral.

As regards the nitrocellulose, the use of less than 15 parts for every 100 parts of acetal resin is to be avoided in general, but satisfactory compositions may be made which contain as much as 60 parts, particularly when a relatively high content of butyl ricinoleate is used. Thus, as regards the relative proportions of nitrocellulose and butyl ricinoleate, the amount of neither of these components should exceed the amount of the other by more than 50% for best results. A preferred range of proportions of nitrocellulose is 20–50 parts for every 100 parts of polyvinyl butyral.

While the invention has been illustrated with respect to aluminum foil having a thickness of 0.001 inch, it is obvious that aluminum articles having other thicknesses and/or other shapes may be coated in accordance with the invention to provide adherent coatings therefor having heat-sealable properties.

The thickness of the coating which is applied to the aluminum foil or other aluminum articles may also be varied to meet particular requirements. However, for most requirements, a thickness of 0.0005–0.005 inch is sufficient for packaging purposes.

In place of the mixture of ethanol and ethyl acetate used in the examples, other solvents for the components of the coating composition may be used. For example, the ratio of ethanol to ethyl acetate may be raised as high as 99:1, or ethanol alone may be used. Also, along with the ethanol and ethyl acetate, such solvents may be incorporated as isopropanol, amyl alcohol, butanol, hexanol, octanol, toluene, etc. Other suitable solvents will be apparent to those skilled in the art.

In addition to the exceptional adhesion to aluminum of the coatings of the invention, they are characterized by the ability to heat seal in a short time (3–10 seconds) under moderate pressures (1–3 pounds per square inch) and elevated temperatures, e. g., 175° C. Furthermore, these coatings are "non-blocking" at ordinary temperatures (or even at moderately raised temperatures), i. e., they do not prematurely adhere, for example, when articles coated therewith are in storage.

Another valuable property of the coating compositions is their excellent strength characteristics as reflected in the high tensile strength of free films thereof and their high heat seal strength.

While the invention has been illustrated by examples showing incorporation of the individual components of the compositions in the solvent, other procedures may be used for combining the several ingredients. For example, the butyl ricinoleate may be admixed with the polyvinyl butyral, and the resulting plasticized polyvinyl butyral then admixed with the nitrocellulose solution. It is preferred to dissolve the nitrocellulose in the solvent or one or more components thereof, rather than attempt to dissolve the nitrocellulose in a solution of the polyvinyl butyral. A further alternative is to dissolve separately the nitrocellulose and the polyvinyl butyral and then combine the solutions. The butyl ricinoleate may be incorporated in either solution, or partly in both.

Instead of applying the compositions on the aluminum from solution, they may be applied in the absence of solvent by the application of heat, with or without pressure. Of course, in the preparation of the compositions, a certain amount of solvent is desirable for purposes of safety while incorporating the nitrocellulose. This solvent may be eliminated before or after the application to the aluminum.

It is obvious that many variations may be made in the products and processes of this invention without departing from the spirit and scope thereof as defined in the appended claims.

What is claimed is:

1. An aluminum article having a highly adhesive heat-sealable coating thereon comprising, on a weight basis, 100 parts of polyvinyl butyral, 15–60 parts of nitrocellulose and 5–50 parts of butyl ricinoleate.

2. An aluminum foil having a highly adhesive heat-sealable coating on a surface thereof, said coating comprising on a weight basis, 100 parts of polyvinyl butyral, 15–60 parts of nitrocellulose and 5–50 parts of butyl ricinoleate.

3. A product as defined in claim 2 in which the coating contains 20–50 parts of nitrocellulose and 20–40 parts of butyl ricinoleate.

GEORGE H. BISCHOFF.

REFERENCES CITED

The following references are of record in the file of this patent:

UNITED STATES PATENTS

| Number | Name | Date |
| --- | --- | --- |
| 2,147,772 | Kallander | Feb. 21, 1939 |
| 2,407,179 | Savage | Sept. 3, 1946 |
| 2,409,548 | Debacher | Oct. 15, 1946 |
| 2,442,936 | Rohdin | June 8, 1948 |